US006257597B1

(12) United States Patent
Galazin

(10) Patent No.: US 6,257,597 B1
(45) Date of Patent: Jul. 10, 2001

(54) ANTI-CREEP DEVICE FOR A TRAILER WITH AIR SPRINGS

(75) Inventor: Gregory T. Galazin, Montague, MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/169,026

(22) Filed: Oct. 9, 1998

Related U.S. Application Data

(63) Continuation of application No. PCT/US97/05976, filed on Apr. 10, 1997, now abandoned.
(60) Provisional application No. 60/015,253, filed on Apr. 10, 1996.

(51) Int. Cl.[7] .................................................. B60G 17/005
(52) U.S. Cl. ............................... 280/6.151; 280/124.116; 280/124.16; 280/754; 280/764.1; 280/86.5
(58) Field of Search ........................... 280/6.151, 124.116, 280/124.157, 124.16, 124.161, 754, 764.1, 763.1, 86.5

(56) References Cited

U.S. PATENT DOCUMENTS

| 2,827,282 | * | 3/1958 | Weiss | 280/124.16 |
| 2,954,987 | * | 10/1960 | Whelan | 280/124.16 |
| 2,997,342 | | 8/1961 | Talbert . | |
| 3,083,059 | | 3/1963 | Biszantz . | |
| 3,096,995 | * | 7/1963 | Richnow, Jr. | 280/754 |
| 4,552,238 | * | 11/1985 | Joyce, Jr. | 280/754 |

FOREIGN PATENT DOCUMENTS

| 2 053 656 | 5/1972 | (DE) . |
| 3 802 788 | 8/1988 | (DE) . |
| 91 06 416 U | 8/1991 | (DE) . |
| 91 12 645 U | 1/1992 | (DE) . |
| 0 373 681 | 6/1990 | (EP) . |
| 0 401 100 | 12/1990 | (EP) . |
| 0 698 547 | 2/1996 | (EP) . |
| 2 187 149 | 8/1987 | (GB) . |
| WO 96/09179 | 3/1996 | (WO) . |

* cited by examiner

Primary Examiner—Lanna Mai
Assistant Examiner—Ruth Ilan
(74) Attorney, Agent, or Firm—Rader, Fishman, Grauer & McGarry

(57) ABSTRACT

An anti-creep device for a trailer includes a support arm adapted to be mounted to a trailer frame proximate a trailer axle for rotational movement between a retracted position and an extended position. An actuator is associated with the support arm for rotating the arm at least to the extended position to thereby lock the frame at a selected height when the frame is raised with respect to the axle. A sensor switch is mounted to the frame in the vicinity of the support arm for sensing the position of the support arm and an indicator is operably connected to the sensor for indicating when the support arm is in the extended position.

7 Claims, 6 Drawing Sheets

ANTI-CREEP DEVICE FOR A TRAILER WITH AIR SPRINGS

CROSS-REFERENCE TO RELATED APPLICATIONS

This application is a continuation of International Application No. PCT/US97/05976 filed Apr. 10, 1997, now abandoned which claims the benefit of U.S. Provisional Application Ser. No. 60/015,253, filed Apr. 10, 1996.

BACKGROUND OF THE INVENTION

1. Field of the Invention

The invention relates to an anti-creep device for use in a trailer suspension, and more specifically in a low-ride trailer suspension. The invention serves to retard the forward and downward movement of the trailer during loading, loss of air spring pressure, or other "stationary" times to limit the creep of the trailer from a loading dock or parked position.

2. Description of the Prior Art

Many trailers have trailing arm suspensions with air springs to control the relative position of the frame with respect to an axle and also to cushion the relative movement of the axle toward the frame due to bumps in the road. In the loading or unloading of a low-ride trailer, the trailer is typically backed up against a dock by the tractor. The operator then pressurizes the air springs of the low-ride suspension so that the bed of the trailer is level with the loading dock. The operator then lowers the front dolly legs on the trailer until they touch the ground and then removes the tractor. In storage situations the tractor may or may not be connected to the trailer. Although the air springs are pressurized by the tractor's air compressor during transport and stationary times, the air compressor is normally off during loading or unloading operations.

As an empty trailer is loaded, the force from the weight of the goods being transferred to the trailer and the loading equipment, such as a forklift or a and car, lowers the rear portion of the frame rail with respect to the axle. Because the compressor is off during the loading operation, the air pressure in the air spring is not adjusted to compensate for the increased load. While the rear portion of the trailer frame moves downwardly, the front portion of the trailer frame is substantially fixed at the height of the dolly and the trailer frame effectively rotates about the contact point of the dolly with the ground. The downward movement of the rear portion of the trailer frame results in the pivotable movement of the pivotal connection between the trailer frame and the trailing arm. This pivotable movement results in the slight rotation of the trailing arm wheel to move the trailer forward. In other words, the trailer tends to move away from the loading dock. This movement is referred to as "creep." Trailer creep can create hazards for loading. This problem is augmented in low-ride trailers, since the air spring is pressurized to a greater height to compensate for the difference between the dock height and trailer bed height. The background and possible solutions to this problem can be found in PCT/US94/10789, which is herein incorporated by reference.

U.S. Pat. No. 5,333,645, issued Aug. 2, 1994, discloses an apparatus for overcoming trailer creep by providing a dump valve to exhaust air from the air spring when the trailer door is opened. The trailer thus bottoms out on the suspension before loading begins and cannot creep away from the dock. Whereas this system has worked well to prevent creep, not all vehicles are equipped with this system, or cannot use such a system. Also, the door switch sometimes malfunctions and the dump valve does not always exhaust air from the air spring.

Therefore, there is a significant need to reduce or eliminate the creep associated with a trailer during loading. The anti-creep solution must also be simple, reliable and inexpensive if it is to be commercially viable. Further, the anti-creep solution must also not interfere with the normal function of the trailing arm suspension during normal operation thereof.

SUMMARY OF THE INVENTION

The invention relates to an anti-creep device for a trailer with a trailing arm suspension, and more especially for a low-ride trailer with a trailing arm suspension. It is simple, convenient and effective, and does not interfere with the normal operation of the trailing arm suspension during normal operation of the trailer. The anti-creep device is adapted for use in a trailing arm suspension comprising a trailing arm rotatably mounted at one of its ends to a trailer frame. At another end of the trailing arm, an air spring is disposed between the trailing arm and the trailer frame to resiliently resist the upward movement of the trailing arm with respect to the frame. An axle is mounted to the trailing arm and mounts a wheel. The anti-creep device comprises a pair of arms adapted to be rotatably mounted to the trailer frame at opposite ends thereof for movement between a retracted position and an extended position. In the extended position, the arms of the anti-creep device are adapted to extend between the frame and the suspension in order to prevent the movement of the axle with respect to the trailer frame and maintain the floor of the trailer level with the loading dock. In the retracted position, the arms are adapted to be disposed above the suspension so that the axle is free to move up and down through its normal range of motion under ordinary conditions.

The anti-creep device further includes an actuator adapted to be mounted between the trailer frame and the arms to control the movement of the arms between the retracted and extended positions. Preferably, the actuator is an air-operated actuator having a shaft adapted to mount to the arms so that the reciprocating movement of the shaft moves the arms between the retracted and extended positions.

In one embodiment, each arm comprises an elongated plate having one end adapted to be pivotally mounted to the trailer frame and having another end for contacting a load pad on the axle of the suspension when the elongated plate is in the extended position, preventing the upward movement of the axle with respect to the trailer frame. Preferably, the air actuator is adapted to be attached to a cross member, which forms part of the trailer frame. A drive cam is attached to the air actuator for rotating the arms of the anti-creep device.

In another embodiment, the anti-creep device comprises a pair of support arms that are adapted to be mounted at opposite sides of the trailer frame for rotational movement between a retracted position and an extended position. The support arms in the extended position are adapted to abut the axle at the opposite sides of the trailer frame to prevent movement of the axle toward the trailer frame and thereby prevent trailer frame creep. The support arms in the retracted position are disengaged from the axle so that the axle is free to move with respect to the frame. An actuator rod is adapted to extend between the opposite sides of the frame, and the pair of support arms are fixedly attached to opposite ends of the actuator rod for rotational movement therewith. An actuator is operably connected to the actuator rod for rotating the rod and thus the support arms between the retracted and extended positions.

According to another embodiment, an anti-creep device comprises a support arm adapted to be mounted to the trailer frame proximate to the axle for rotational movement between a retracted position and an extended position. The support arm includes a plurality of notches extending along a length thereof. A support member is adapted to be connected to the suspension and has at least one surface for receiving one of the support arm notches when the support arm is in the extended position to prevent movement of the axle toward the trailer frame and thereby prevent the trailer frame from creeping. The notches of the support arm in the retracted position are disengaged from the support member so that the axle is free to move with respect to the frame. An actuator is associated with the support arm for rotating the arm at least to the extended position to thereby lock the frame at a selected height when the frame is raised with respect to the axle.

Further according to the invention, a suspension for a vehicle includes a pair of trailing arms with a first end adapted to be rotatably mounted to opposite sides of a trailer frame, an air spring disposed on each trailing arm is adapted to be mounted to the trailer frame to resiliently resist the upward movement of the trailing arms with respect to the frame, and an axle connected to the trailing arms. The axle has opposite ends adapted for mounting wheels thereto. A support arm is adapted to be mounted to the trailer frame proximate to the axle for rotational movement between a retracted position and an extended position. The support arm in the extended position is adapted to abut the suspension to prevent movement of the axle with respect to the trailer frame and thereby prevent trailer frame creep. In the retracted position, the support arm is disengaged from the suspension so that the axle is free to move with respect to the frame. An actuator is operably associated with the support arm for rotating the support arm between the retracted and extended positions. The actuator is operably connected to a pressure switch that is at least fluidly connected to the air brake. The actuator is adapted to rotate the support arm in response to a change in air pressure at the pressure switch due to a change in air pressure at the air brake.

In a preferred embodiment, an air brake is mounted to the axle, and includes a spring brake actuator for preventing wheel rotation when air pressure is released from the spring brake actuator; and an air pressure source for supplying air under pressure to the spring brake actuator. In one embodiment, the pressure switch is a valve assembly for supplying pressurized air to and exhausting pressurized air from the actuator and air brake. In another embodiment, the actuator is an electrical actuator and the pressure switch controls operation of the actuator in response to the presence or absence of pressure on the air brake.

In each of the above embodiments, a support arm position sensor or switch can be provided for alerting an operator that the support arm is in the extended position.

BRIEF DESCRIPTION OF THE DRAWINGS

The invention will now be described with reference to the drawings wherein.

DETAILED DESCRIPTION OF THE PREFERRED EMBODIMENTS

Figure 1:
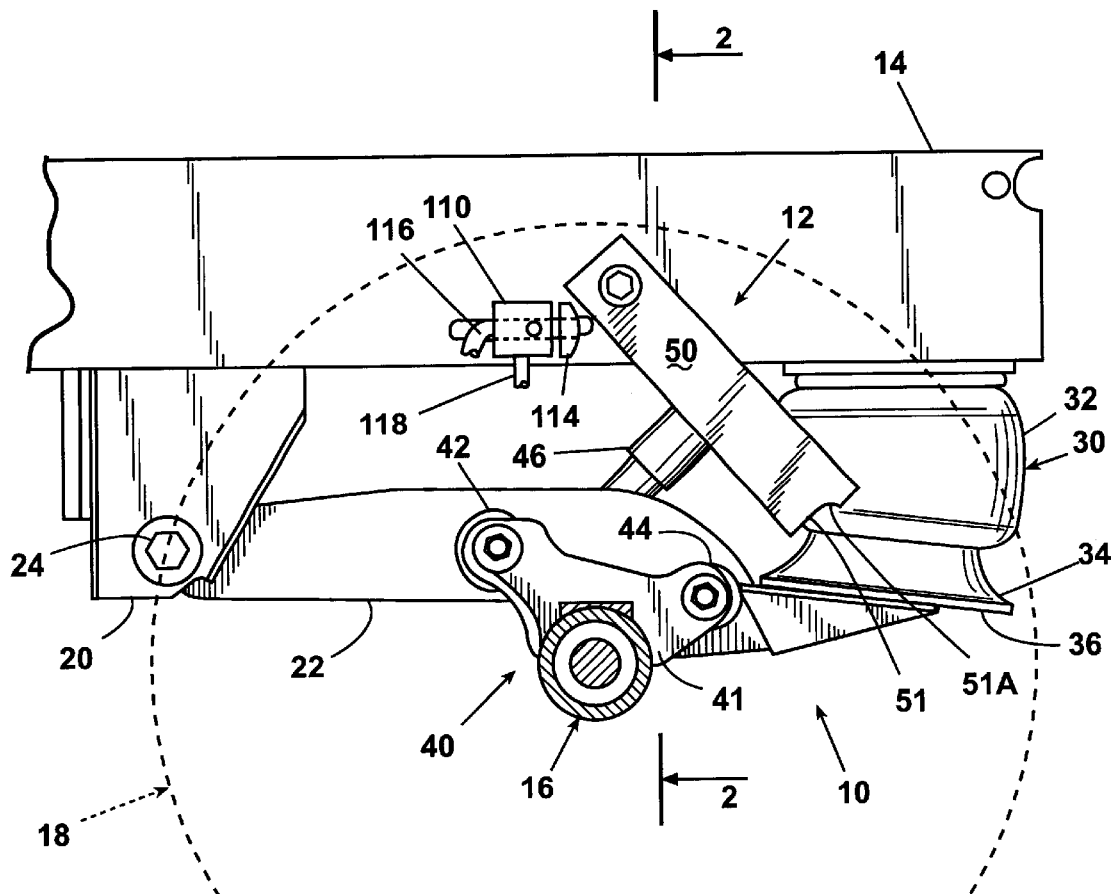
FIG. 1 is a side view of a trailing arm suspension incorporating the anti-creep device according to the invention.

FIG. 1 illustrates a trailing arm suspension 10 incorporating the anti-creep device 12 according to the invention. The trailing arm suspension 10 is mounted to a longitudinal frame rail 14 of a trailer frame and supports an axle 16 to which wheels 18 are mounted on opposite ends of the axle 16. In a typical trailer application, two trailing arms are used to mount the axle 16 to the frame rail 14. The trailing arms are mounted on opposite sides of the frame rail and support opposing ends of the axle 16. Only one of the trailing arms will be described in detail.

The trailing arm suspension 10 comprises a hanger bracket 20 fixedly mounted to the frame rail 14 and to which is rotatably mounted a trailing arm 22 by means of a bushed connection 24 at the forward end of the trailing arm 22. The rearward end of the trailing arm 22 mounts an air spring 30 at a lower end thereof, which is connected to the frame rail 14 at its upper end. The air spring 30 resiliently resists upward movement of the trailing arm 22 with respect to the frame and comprises an air bag 32 mounted to the frame rail 14 and a piston 34 mounted to a platform 36 on the trailing edge of the trailing arm 22. As the trailing arm 22 rotates, the piston 34 is urged into the air bag 32 to resiliently retard movement of the trailing arm 22 toward the frame rail 14.

The axle 16 is mounted to the trailing arm 22 by an axle mounting bracket 40 having opposing plates 41, which are connected to the trailing arm 22 through two bushed connections 42 and 44. A shock absorber 46 can be mounted between the frame rail 14 and the axle bracket 40 to dampen the movement of the trailing arm 22 with respect to the frame.

Figure 2:
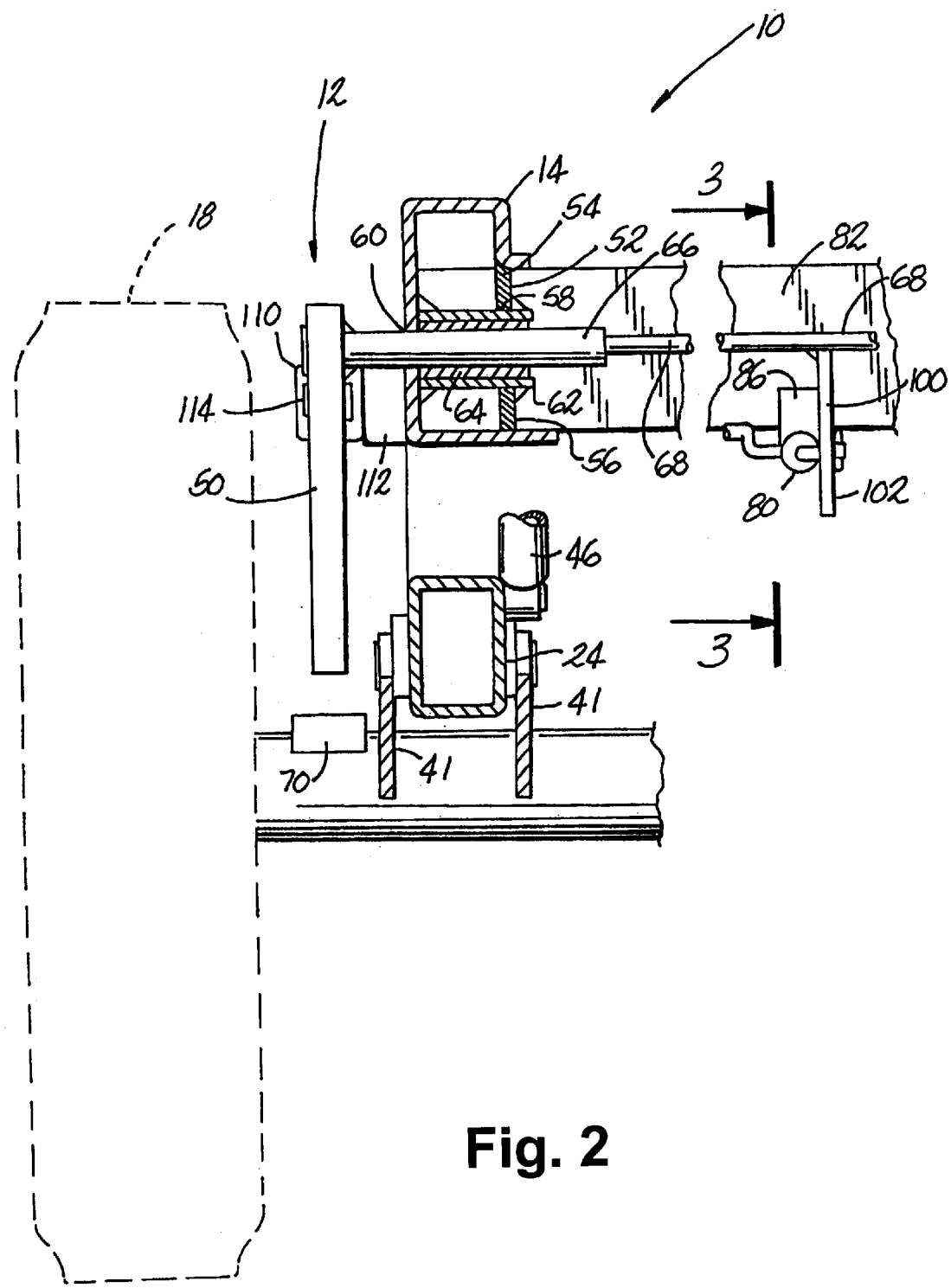
FIG. 2 is a partial sectional view taken along line 2—2 of FIG. 1.
Figure 3:
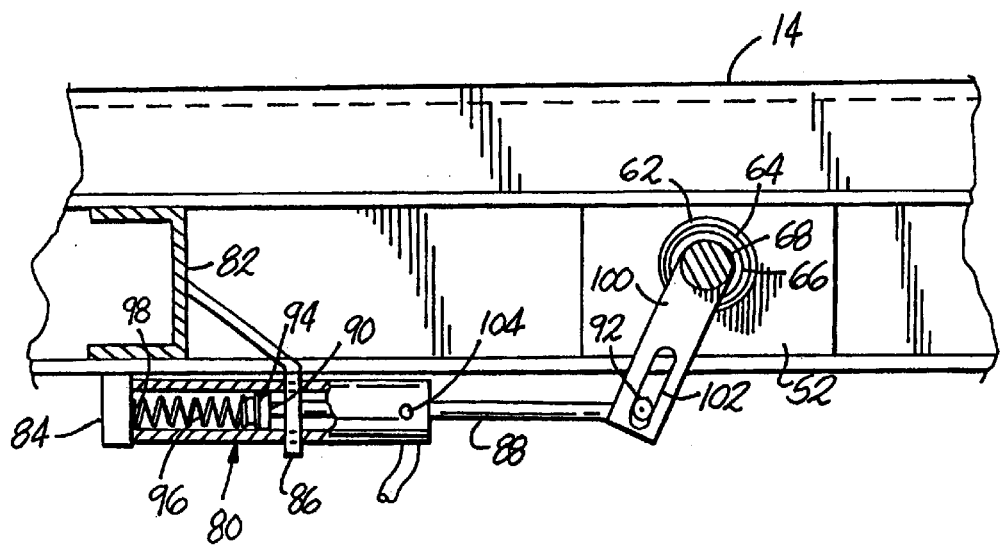
FIG. 3 is a side view looking toward the trailing arm suspension of FIG. 1 and showing the actuator cylinder of the anti-creep device according to the invention.

Referring to FIGS. 1–3, two anti-creep devices 12 are associated with the axle 16 on opposite sides of the frame 14. Only one of the anti-creep devices will be described in detail, it being understood that the other anti-creep device is constructed in the same manner. The anti-creep device 12 includes a flipper plate or support arm 50 pivotally attached to frame rail 14 for engaging axle 16. As seen most clearly in FIG. 3, a support plate 52 is welded or otherwise attached at a support plate first end 54 and support plate second end 56 to frame rail 14. The support plate 52 has a central bore 58 therein. Frame rail 14 has a corresponding bore 60 in alignment with central bore 58. Central bore 58 is larger than frame rail bore 60 for receiving a bushing housing 62 therein. Bushing housing 62 is welded or otherwise attached between support plate 52 at the periphery of the central bore 58, and frame rail 14. A bushing 64 is positioned in bushing housing 62. The bushing 64 is preferably constructed of bronze, but other materials may be used. A main rod 66 is positioned in bushing 64 for rotation relative thereto. Flipper plate 50 is attached to main rod 66 for rotation therewith. Although FIG. 3 shows only one anti-creep device 12, it is to be understood that a similar anti-creep device 12 is mounted on an opposite side of the frame rail 14. An extension rod 68 is attached between main rods 66 located on opposite sides of frame rail 14. The main rod 66 has a larger diameter than extension rod 68 since main rod 66 will ultimately support the weight of the trailer and its contents when flipper plate 50 is rotated to engage axle 16.

A load pad 70 preferably constructed of steel is attached to axle 16 by welding. An indentation 51 extends across a portion of a bottom edge of the flipper plate 50 for contacting load pad 70.

Referring now to FIGS. 2 and 3, a rear cross member 82 extends to opposite sides of frame rail 14. A long stroke actuator cylinder 80 is attached to rear cross member 82 through a rear cylinder bracket 84 and forward cylinder bracket 86. The brackets 84, 86 firmly engage cylinder 80 and are rigidly attached to cross member 82. Actuator cylinder 80 includes a shaft 88 which extends from a first shaft end 90 inside cylinder 80 to a second shaft end 92 outside cylinder 80. First shaft end 92 is attached to a fluid tight plunger 94. A compression spring 96 located between plunger 94 and cylinder rear wall 98 biases shaft 88 outwardly of cylinder 80. The second cylinder shaft end 92 is slidably located in slot 102 of drive cam 100. Drive cam 100 is in turn fixedly secured to extension rod 68 for rotatable movement therewith. Slot 102 in drive cam 100 permits shaft 90 to linearly reciprocate through the arcuate movement of cam 100. An actuator air port 104 is preferably in fluid communication with a pressurized air source, such as the air source for the brake actuators. Thus, when the pressure to the brake actuators is removed, the air is exhausted from the cylinder 80 and the shaft 88 is forced toward the extended position (to the right as viewed in FIG. 3) by the compression spring 96.

As shown in FIGS. 1 and 2, a normally closed sensor switch 110 is directly mounted on frame rail 14 or may be mounted through an extension plate 112. The sensor switch 110 is mounted for lateral adjustment along the frame rail 14 so as to be proximal to flipper plate 50. Sensor switch 110 includes a pressure protection valve port 116 and a shuttle valve port 118. A plunger 114 moves between open and closed positions to direct pressurized air to either port 116 or port 118. Plunger 114 is pushed inward when flipper plate is in the extended position, thus opening sensor switch 110. In the open position, sensor switch 110 serves to signal to the operator that flipper plate 50 is in the extended position so as to avoid possible suspension damage when pulling or backing the trailer. Sensor switch 110 may in addition or alternatively disable the tractor or trailer from operating when flipper plate 50 is extended.

Figure 9:
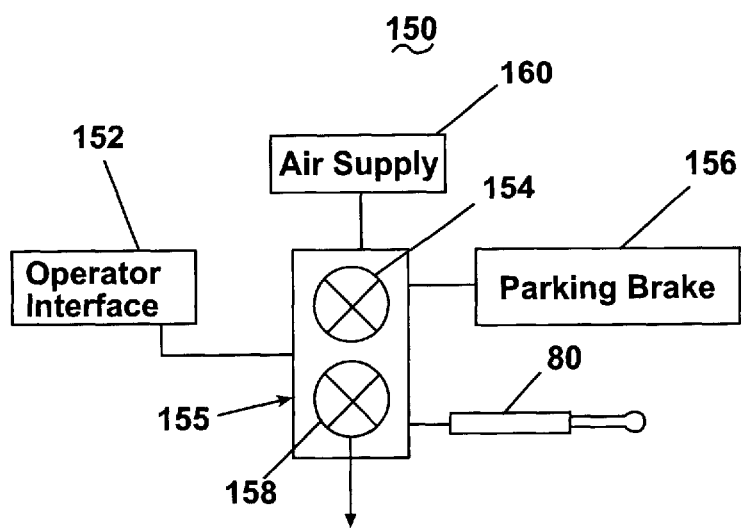
FIG. 9 is a block diagram of a system for operating the anti-creep device.

With reference now to FIG. 9, a block diagram of a system 150 for operating the anti-creep device is illustrated. The system 150 includes an operator interface 152 for releasing and setting an air-operated parking or emergency brake 156 that forms part of an air brake actuator (not shown), often referred to as a spring brake actuator. The operator interface is connected to a valve assembly 155 having an air supply valve 154 and an air release valve 158. The air supply and release valves are each in turn connected to the parking brake 156 and the anti-creep actuator 80. The parking brake 156 includes a chamber having a rod (not shown) that is normally biased outward of the chamber to apply braking pressure to the wheels of the vehicle in a well known manner. When the air supply valve is open and the air exhaust valve is closed, air under pressure is supplied to the chamber from an air pressure supply source 160, which is connected to the valve 154, to push the rod inwardly of the chamber when the parking brake is released. The air supply 160 typically comprises a compressor for generating compressed air and a tank for storing the compressed air. When an operator sets the parking brake, the air supply valve 154 is closed and the exhaust valve is simultaneously opened to exhaust air from the chamber through the valve 158. The parking brake and its method of operation is well known in the art and, therefore, will not be described in further detail. Since the actuator 80 and parking brake 156 are both connected to the air supply valve 154 and air exhaust valve 158, air pressure is simultaneously supplied to the actuator and parking brake when the valve 154 is opened and the valve 158 is closed and is simultaneously released from the actuator 80 and parking brake 156 when the valve 154 is closed and the valve 158 is opened. The valve assembly 155 thus functions as a pressure switch for controlling operation of the actuator in response to setting and releasing the parking brake.

In operation, as the trailer is being pulled by a tractor, the air supply valve 154 is normally open and the actuator 80 is pressurized by air from the air supply 160 which enters the air port 104 and biases the plunger 94 inward against the compression spring 96, thus keeping flipper plate 50 in the retracted position. With the flipper plate 50 in the retracted position, the trailer is backed into a loading dock area so that the end of the trailer abuts the end of the loading dock. The axle 16 of the low-ride suspension 10 can be in the axle full up position illustrated in full lines in FIG. 4, and the flipper plates 50 are in the retracted position (also illustrated by the phantom lines in FIG. 4) during trailer pulling or backing. The operator then pressurizes the air springs of the low-ride suspension such that the rear axle is in the full down position where the frame is fully raised (illustrated by the phantom lines in FIG. 4), and the bed of the trailer is level with the loading dock. The air is then exhausted from the parking brake by simultaneously closing the air supply valve 154 and opening the air exhaust valve 158 to set the parking brake, whereupon the pressure in the cylinder 80 is also exhausted and the shaft 88 is extended due to the force of spring 96, thereby pivoting drive cam 100, which in turn pivots the flipper plates 50 to the extended position (illustrated in phantom lines in FIG. 4). In the extended position, edge 51A of flipper plate channel 51 abuts an edge of load pad 70, thereby stopping further rotation of the flipper plate 50.

As the uncoupled trailer is loaded, the weight placed on the frame rail 14 by loading devices, such as hand carts and forklifts, and the goods that are carried on the loading devices lower the frame rail 14. As the frame rail drops, flipper plate channels 51 of flipper plates 50 move towards the load pads 70. Once flipper plates 50 contact the load pads 70, the frame rail 14 is prevented from moving downwardly with respect to the trailing arm 22 and thus prevents creeping of the trailer away from the dock.

Figure 4:
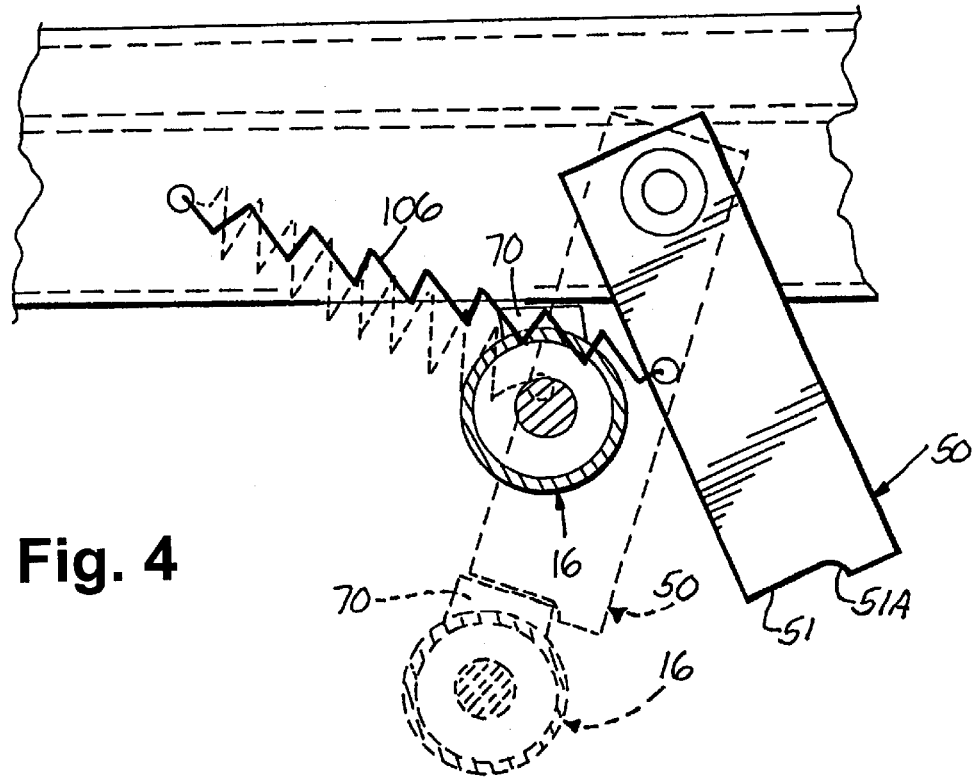
FIG. 4 is a schematic side view of the trailing arm suspension shown in FIG. 1, with the anti-creep device in retracted and extended positions.

When trailer loading or unloading is completed, the air supply is turned on, the air supply valve 154 is opened, and the air exhaust valve 158 is simultaneously closed, to pressurize actuator cylinder 80 to thereby rotate the flipper plates to the retracted position illustrated in full lines in FIG. 4 and release the parking brake. The air spring is then depressurized to lower the frame rail 14 to its travel height.

As shown in FIG. 4, an optional extension spring 106 can be connected between flipper plate 50 and frame rail 14. Extension spring 106 can replace or add to compression spring 96 located in actuator cylinder 80, depending on the amount of force required to rotate the flipper plates. Although two forms of springs are contemplated, it is preferred that the compression spring 96 be used, since it is protected from outside contamination within actuator cylinder 80.

Figure 5:
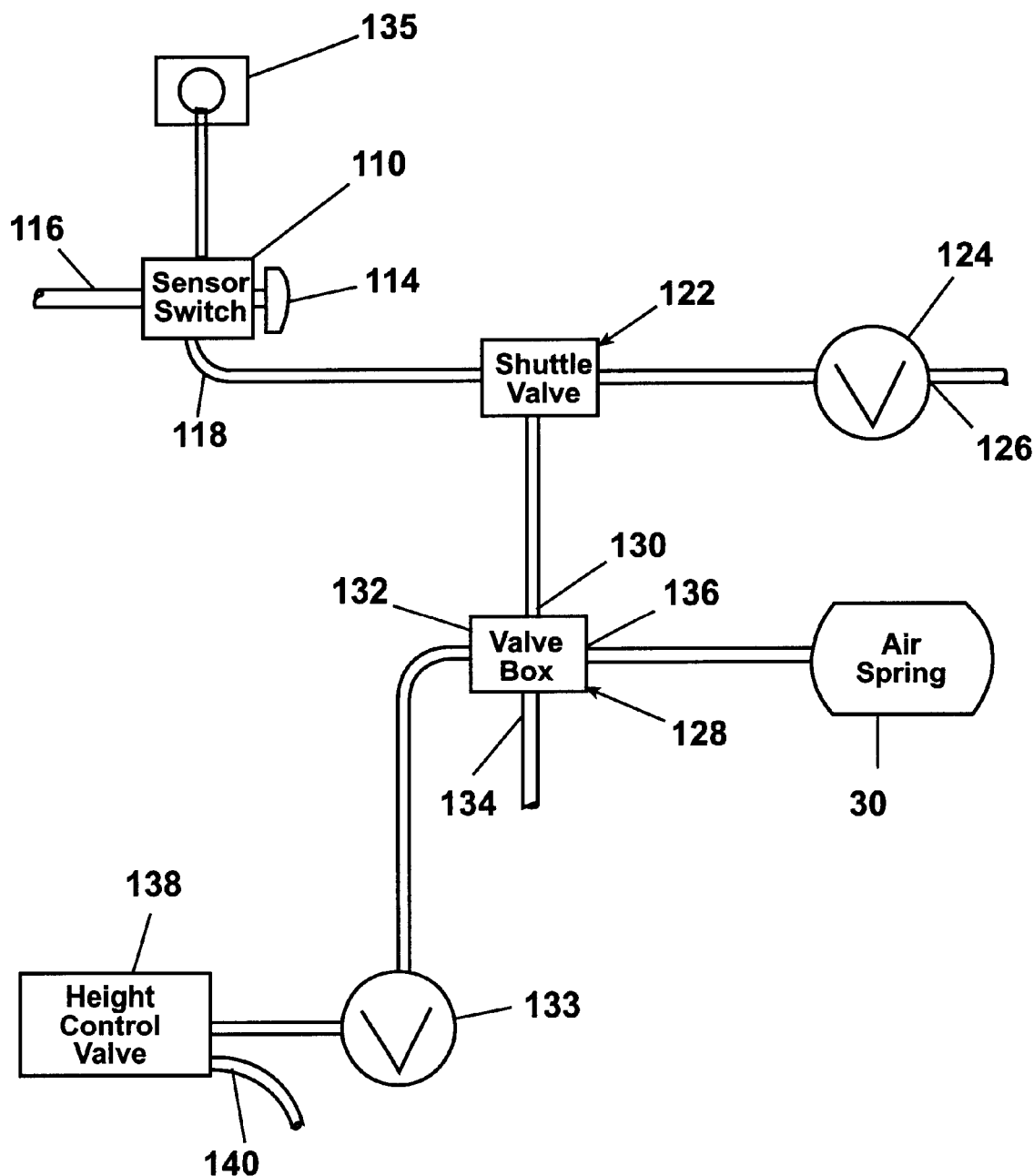
FIG. 5 is a schematic view of an air control circuit according to the invention.

Referring now to FIG. 5, air control circuit 120 incorporates sensor switch 110. Sensor switch 110 is connected to shuttle valve 122, which is in turn connected to an on/off valve 124 to raise or lower the trailer. On/off valve 124 is also connected to a pressure protection port 126 connected to a pressure protection valve (not shown). A valve box 128 includes a pilot valve 130 connected to shuttle valve 122, a normally open valve 132 connected to a quick exhaust valve 133, a normally closed valve 134 connected to a pressure protection valve (not shown), and a cylinder valve 136 connected to air springs 30. Quick exhaust valve 133 is connected to height control valve 138. Height control valve 138 has a pressure protection port 140 connected to a pressure protection valve (not shown).

In normal operation, i.e. when the trailer is being pulled or backed up, the on/off valve 124 is normally in the off position. This permits pressurized air from the height control valve 138 to enter and exit the air springs 30 through the normally open port 132. When the valve 124 is turned on by the operator, high pressure air is channeled through the shuttle valve 122 to the pilot valve 130. High pressure from the pilot valve closes valve 132, opens valve 134 and permits pressurized air to pass through the cylinder valve 136 to pressurize air springs 30. Air springs 30 in turn raise the bed of the trailer to the dock height, whereupon the on/off valve 124 is turned off. Flipper plate 50 is then rotated to its extended position. Flipper plate 50 in the extended position biases against sensor plunger 114 which opens the normally closed sensor switch. In this condition, high pressure from sensor switch 110 is directed through shuttle valve 122 through pilot valve 130. This maintains high pressure to air springs 30, assuring that flipper plate 50 can be retracted when the trailer is fully loaded. After loading or unloading the trailer, flipper plate 50 is retracted. This causes sensor switch 110 to close again, which creates a low pressure at pilot valve 130. Port 132 opens, permitting pressurized air from air springs 30 to escape through quick exhaust valve 133 until the pressurized air in air springs 30 is equal to the pressurized air present in the height control valve, thus lowering the trailer to its ride height.

In the event that flipper plate 50 is not retracted, the sensor switch 110 sends an audible and/or visible signal to the operator by indicator 135 that the flipper plate must be rotated to the retracted position.

Although only one actuator 80 is shown, it is to be understood that two or more actuators may be used with a single or plurality of drive cams 100. Moreover, although only one sensor switch 110 is shown, it is contemplated that two sensor switches, each associated with its respective flipper plate, may be provided.

Figure 6:
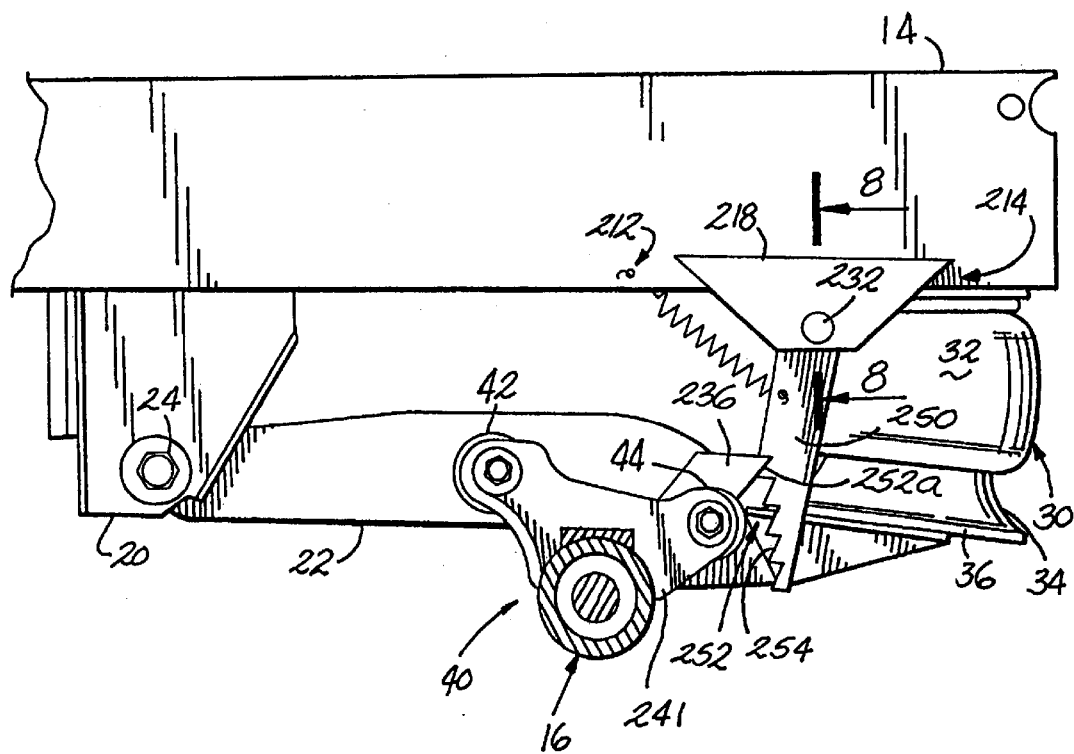
FIG. 6 is a side view of a trailing arm suspension incorporating the anti-creep device according to a second embodiment of the invention.
Figure 8:
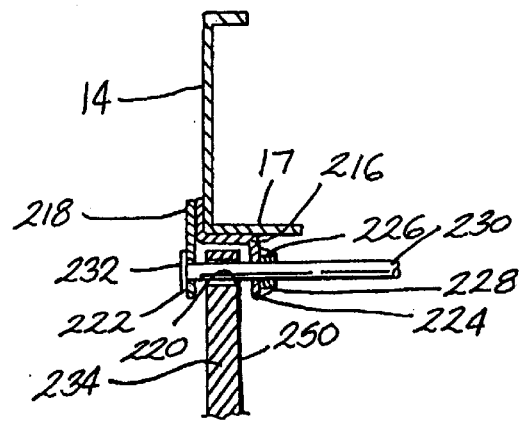
FIG. 8 is a partial sectional view taken along line 8—8 of FIG. 6.
Figure 7:
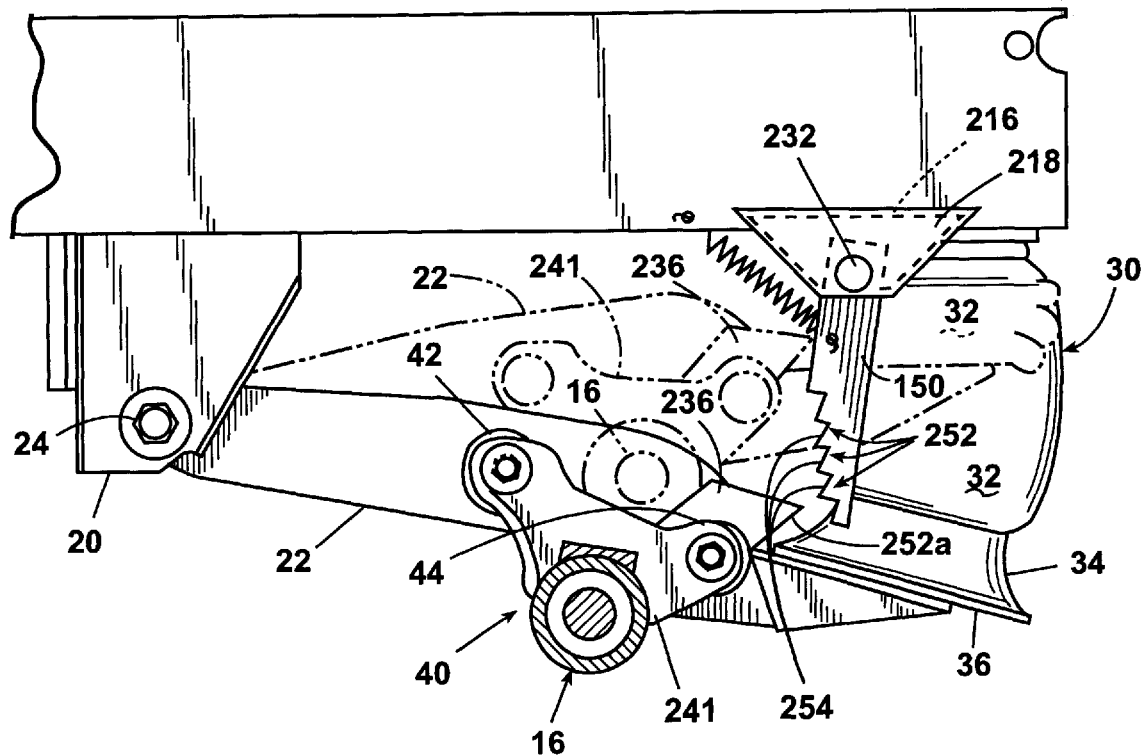
FIG. 7 is a view similar to FIG. 6 showing the different positions of the axle with respect to the flipper plate.

Referring now to FIGS. 6–8, there is shown an alternate embodiment of an anti-creep device 212 according to the invention. Like parts in the previous embodiment are represented by like numerals. Two anti-creep devices 212 are associated with the axle 16 on opposite sides of the frame 14. Only one of the anti-creep devices will be described in detail, it being understood that the other anti-creep device is constructed in the same manner. The anti-creep device 212 includes a flipper plate 250 pivotally attached to a mounting assembly 214.

As seen most clearly in FIG. 8, the mounting assembly 214 includes a first plate 216 shaped to fit around the side 15 and bottom 17 of frame rail 14. The first plate 216 is preferably welded to the frame rail but may be secured through other well-known means. A second flat plate 218 is welded or otherwise secured to the first plate at a top portion thereof. A bore 220 at a lower portion of first plate 216 is in alignment with a bore 222 at a lower portion of second plate 218. A gusset 224 is welded to first plate 216 and includes a bore 226 in alignment with apertures 220 and 222. A bushing 228 is positioned in bore 226. The bushing is preferably constructed of bronze, but other materials can be used. A main rod 230 is positioned in bushing 228 for rotation relative thereto. Flipper plate 250 is non-rotatably attached to main rod 230 at a position between the first and second plates for rotation with the main rod. A flange 232 is attached to opposite ends of the main rod at a location outwardly of the second plates to prevent the main rod from sliding laterally. An extension rod 234 is attached between main rods 230 located on opposite sides of the frame rail 14. As in the previous embodiment, the main rod 230 has a larger diameter than extension rod 234 since main rod 230 will ultimately support the weight of the trailer and its contents when flipper plate 250 is rotated to secure the axle 16 against movement. The main rod 230 is rotated in the same manner as main rod 66 in the previous embodiment. A centerline 234 of the swing plate 250 is ideally in alignment with the side 15 of frame rail 14 for minimizing any torque that may be present on the first and second plates.

As illustrated in FIGS. 6 and 7, the flipper plate 250 includes a plurality of notches 252 for engaging a pawl 236 welded to the outside plate 41. One end of an extension spring 238 is attached to frame 14 and another end is attached to flipper plate 250. The extension spring serves to bias flipper plate 250 against pawl 236. As in the previous embodiment, extension spring 238 can replace or add to compression spring 96 in actuator cylinder 80, depending on the amount of force required to rotate the flipper plates.

In operation, as the trailer is being pulled by a tractor, the long stroke actuator cylinder 80 is pressurized by the air supply 160 that is in fluid contact with the chamber of the parking brake 156 which enters the air port 104 and biases the plunger 94 inward against the compression spring 96, thus keeping flipper plate 250 in the retracted position, as in the previous embodiment. With the flipper plate 250 in the retracted position, the trailer is backed into a loading dock area so that the end of the trailer abuts the end of the loading dock. The axle 16 of the low-ride suspension 10 is in the axle full up position where the frame is lowered, as shown in phantom lines in FIG. 7, and the flipper plates 250 are in the retracted position during trailer pulling or backing. The operator can then either pressurize the air springs of the low-ride suspension to move the axle toward the full down position such that the frame is raised, as shown in solid line in FIG. 7, or exhaust the air pressure from actuator cylinder 80 to rotate the flipper plates toward pawl 236. In a preferred operation of the present embodiment, the air is first exhausted from actuator cylinder 80 (FIG. 3) by exhausting air from the air brake system 150, thereby setting the parking brake. As in the previous embodiment, the valve assembly 155 functions as a pressure switch for controlling operation of the actuator in response to setting and releasing the parking brake. When air is exhausted from the brake system and actuator, the shaft 88 is extended due to the force of spring 96 and/or tension spring 238, thereby pivoting drive cam 100 which in turn rotates the flipper plates 250 in a clockwise direction as shown in FIGS. 6 and 7 to engage the pawl 236. In the rotated position, edge 253 of flipper plate 250 abuts a corner 237 of pawl 236, thereby stopping further rotation of the flipper plate 250. The air springs 30 are then pressurized to raise the frame 14 with respect to the axle, until the bed of the trailer is even with the loading dock. As the air springs are pressurized, the flipper plate edge 253 rides along the corner 237 of pawl 236 until a first notch 252A receives the corner. At this point, if the trailer bed is at the proper height, the pressure in the air springs is released such that the pawl firmly seats in the notch to support the trailer weight. If the first notch 252A does not define the required trailer bed height, the air springs continue to be pressurized to raise the frame 14 even further with respect to the axle 16. As the frame 14 is raised, flipper plate 250 is forced to swing in a counter-clockwise direction as viewed in FIGS. 6 and 7 due to the notch ramped surface 254 until the second notch 252A is reached. This operation is continued until the proper trailer bed height is reached. Thus, the pawl and flipper plate notches function as a ratchet mechanism for positioning the trailer bed at the desired height. In a preferred arrangement, five notches are provided at every inch for locking the axle with respect to the frame. Once the pawls are seated in a corresponding notch, the frame rail 14 is rigidly supported by the flipper plates 250 on the axle 16 and thus creeping of the trailer away from the dock is prevented.

When trailer loading or unloading is completed, the air supply is turned on again to pressurize the air springs to thereby disengage the pawl and flipper plate notch. The air brake system and actuator cylinder 80 are then simultaneously pressurized to thereby rotate the flipper plates to their retracted position and release the parking brake. The air spring is subsequently depressurized to lower the frame rail 14 to its travel height.

The anti-creep device according to the invention provides a simple and reliable solution to the trailer creep problem. The anti-creep device also can be installed as original equipment or as a retrofit.

While the invention has been described with reference to its preferred embodiment, it will be understood by those skilled in the art that various changes may be made and equivalents may be substituted for elements thereof without departing from the spirit and scope of the invention. For example, the actuator cylinder 80 can be replaced by an air brake actuator to accomplish similar results to either embodiment. Instead of an air-pressured actuator cylinder, it is contemplated that an electrically operated actuator can be used in place thereof, such as a spring-loaded solenoid. In this instance, an electrical pressure switch (not shown) can be in fluid communication with the chamber of the spring brake actuator to supply electrical power to the actuator in response to a reduction in air pressure in the spring brake chamber, such as when the parking brake is set, and to cut off electrical power from the actuator when pressure is restored to the spring brake chamber. When power is supplied to the actuator, a solenoid shaft extends in the same manner as the air pressured actuator to rotate one or both flipper plates toward the extended position. Many other modifications may be made to adapt a particular situation or material to the teaching of the invention without departing from the scope of the invention.

The embodiments of the invention in which an exclusive property or privilege is claimed are defined as follows:

1. In an anti-creep device for a suspension having a pair of trailing arms with a first end rotatably mounted to opposite sides of a trailer frame, an air spring disposed between each trailing arm and the trailer frame to resiliently resist the upward movement of the trailing arms with respect to the frame, and an axle connected to the trailing arms, the axle having opposite ends adapted for mounting a wheel thereto, the anti-creep device comprising:

a pair of support arms adapted to be mounted at opposite sides of the trailer frame for rotational movement between a retracted position and an extended position, the support arms in the extended position being adapted to abut the suspension at the opposite sides of the trailer frame to prevent movement of the axle toward the trailer frame and thereby prevent trailer frame creep, the support arms in the retracted position being disengageable from the suspension so that the axle is free to move with respect to the frame;

an extension rod adapted to extend between the opposite sides of the frame, the pair of support arms being fixedly attached to opposite ends of the extension rod for rotational movement therewith; and an actuator operably connected to the extension rod and adapted to rotate the extension rod and thus the support arms between the retracted and extended positions; the improvement which comprises;

a sensor switch adapted to be mounted to the frame in the vicinity of at least one of the support arms for sensing the position of the at least one support arm; and an indicator operably connected to the sensor for indicating when the at least one support arm is in the extended position.

2. An anti-creep device according to claim 1 wherein the actuator includes a housing that is adapted to be fixed with respect to the trailer frame and a shaft that reciprocates with respect to the housing; an outer end of the shaft being connected to the actuator rod for selectively moving the arms between the retracted and extended positions.

3. An anti-creep device according to claim 2 and further comprising a spring within the actuator housing for biasing the shaft outwardly of the housing to thereby bias the support arms toward the extended position.

4. An anti-creep device according to claim 3 wherein an inner end of the shaft includes a plunger and the housing is connected to a source of pressurized air to force the shaft inwardly of the housing against the bias of the spring when air pressure is applied to the plunger, to thereby rotate the support arms to the retracted position.

5. An anti-creep device according to claim 1 and further comprising a load pad adapted to be secured at each end of the suspension in lateral alignment with each support arm, a lower portion of each support arm contacting the respective load pad in the extended position.

6. An anti-creep device according to claim 5 wherein the lower portion of each support arm includes at least one notch for contacting the respective support member.

7. In a low-ride trailer having a suspension including a pair of trailing arms with a first end rotatable mounted to opposite sides of a trailer frame, an air spring disposed between each trailing arm and the trailer frame to resiliently resist the upward movement of the trailing arms with respect to the frame, and an axle connected to the trailing arms, the axle having opposite ends adapted for mounting wheels thereto; an air operated parking brake for applying braking force to said wheels in the absence of air pressure to the parking brake; an air supply for supplying air under pressure to the parking brake;

a support arm mounted to the trailer frame proximate to the axle for rotational movement between a retracted position and an extended position, the support arm in the extended position being adapted to abut a portion of the suspension to prevent movement of the axle with respect to the trailer frame and thereby prevent trailer frame creep, the support arm in the retracted position being disengaged from the suspension so that the axle is free to move with respect to the frame; and an actuator operably associated with the support arm for selectively rotating the support arm between the retracted and extended positions, the improvement which comprises;

a pressure switch that is at least fluidly connected to the parking brake and the actuator wherein the actuator rotates the support arm to the extended position when air under pressure is removed from the parking brake; and further comprising a sensor switch mounted to the frame in the vicinity of the support arm for sensing the position of the support arm; and an indicator operably connected to the sensor for indicating when the support arm is in the extended position.

\* \* \* \* \*

UNITED STATES PATENT AND TRADEMARK OFFICE
CERTIFICATE OF CORRECTION

PATENT NO. : 6,257,597 B1
DATED : July 10, 2001
INVENTOR(S) : Gregory T. Galazin Page 1 of 1

It is certified that error appears in the above-identified patent and that said Letters Patent is hereby corrected as shown below:

Title page,
Item [57] ABSTRACT, line 2, "trailer frame proximate a trailer" should read -- trailer frame proximate to a trailer --;

Column 1,
Lines 8-9, "now abandoned which claims the benefit" should read -- now abandoned, which claims the benefit --;
Line 39, "such as a forklift or a and car" should read -- such as a forklift or handcar --;

Column 10, claim 7,
Line 56, "with a first end rotable mounted" should read -- with a first end rotatably mounted --.

Signed and Sealed this

Twenty-sixth Day of February, 2002

*Attest:*

*Attesting Officer*

JAMES E. ROGAN
*Director of the United States Patent and Trademark Office*